(12) United States Patent
Fujiwara

(10) Patent No.: US 10,958,143 B2
(45) Date of Patent: Mar. 23, 2021

(54) ASSEMBLING DEVICE

(71) Applicant: HONDA MOTOR CO., LTD., Tokyo (JP)

(72) Inventor: Hideo Fujiwara, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 292 days.

(21) Appl. No.: 16/277,112

(22) Filed: Feb. 15, 2019

(65) Prior Publication Data

US 2019/0267878 A1 Aug. 29, 2019

(30) Foreign Application Priority Data

Feb. 23, 2018 (JP) .............................. JP2018-031095

(51) Int. Cl.
*H02K 15/00* (2006.01)
*H02K 15/06* (2006.01)
*H02K 3/12* (2006.01)

(52) U.S. Cl.
CPC ............. *H02K 15/067* (2013.01); *H02K 3/12* (2013.01); *H02K 15/0087* (2013.01); *Y10T 29/49009* (2015.01)

(58) Field of Classification Search
USPC ...... 29/596, 559, 598, 602.1, 605, 606, 721, 29/735, 736
See application file for complete search history.

(56) References Cited

U.S. PATENT DOCUMENTS 8,726,493 B2 * 5/2014 Guercioni .......... H02K 15/0081
29/606
2018/0233995 A1 * 8/2018 Okuda ................ H01R 43/205

FOREIGN PATENT DOCUMENTS

WO 2014/010642 1/2014

* cited by examiner

*Primary Examiner* — Thiem D Phan
(74) *Attorney, Agent, or Firm* — Rankin, Hill & Clark LLP

(57) ABSTRACT

An assembling device (10) includes a first rotating portion (11), a second rotating portion (12), and eighteen support arms (13) for supporting coil segments (4), and a motor (29). The first rotating portion (11) includes a first rotating plate (11a) having first holding portions (1d) on an outer peripheral surface thereof. The second rotating portion (12) includes a second rotating plate (12a) having second holding portions (12c) on an outer peripheral surface thereof. The motor (29) rotates the first rotating portion (11) in a counterclockwise direction D1, and the second rotating portion in a clockwise direction D2. Thus, the base parts (21) of the first to eighteenth support arms (13) are transferred from the first holding portions (11d) to the second holding portions (12c) so that the coil segments (4) are assembled to overlap with one another.

5 Claims, 16 Drawing Sheets

ASSEMBLING DEVICE

BACKGROUND OF THE INVENTION

Field of the Invention

The present invention relates to an assembling device for assembling object members.

Description of the Related Art

A rotating electric machine such as an electric motor or an electric generator includes a stator formed in a cylindrical shape, and a rotor rotatably disposed inside the stator. After the legs of each coil segment (electrical conductor) formed in a U-shape are inserted into the slots provided on a stator core of the stator, projecting portions are bent and welded in a circumferential direction, and a coil is thereby formed.

In an electrical conductor aligning device and an aligning method disclosed in International Publication No. 2014/010642, the aligning device includes a plurality of holding portions that hold one leg of each of a plurality of electrical conductors formed in a U-shape, and a moving part that causes the plurality of holding portions to move in a radial direction, and the plurality of electrical conductors are aligned in an annular shape while overlapping in the circumferential direction, by causing the holding portions holding one leg of each of the electrical conductors to move to an inner side in the radial direction by way of the moving part when the plurality of electrical conductors are to be aligned.

However, in an electrical conductor aligning device and an aligning method disclosed in International Publication No. 2014/010642, the moving part that causes the holding portions holding one leg of each of the electrical conductors to move is required, and thereby the device becomes complicated.

The present invention has been made in view of the above-described circumstances, and an object of the present invention is to provide an assembling device for assembling a plurality of object members by a simple structure.

SUMMARY OF THE INVENTION

An assembling device of the present invention is an assembling device for assembling a plurality of object members, the object members each including two legs and a connecting portion connecting the two legs, the assembling device including: a plurality of support arms, the support arms each including a support portion for supporting a leg of the object member and a base part spaced apart from the support portion; a first rotating member that has an outer peripheral portion formed in a first arc, the first rotating member being arranged to be rotatable in a first circumferential direction around a center of curvature of the first arc; a second rotating member that has an outer peripheral portion adjacent to the first arc, the outer peripheral portion being formed in a second arc shape having a center of curvature that is located on an opposite side of the outer peripheral portion of the first rotating member from a center of curvature of the first arc, the second rotating member being arranged to be rotatable in a second circumferential direction opposite to the first circumferential direction around the center of curvature of the second arc; and a rotation mechanism that causes the first rotating member to rotate in the first circumferential direction, and causes the second rotating member to rotate in the second circumferential direction, in which the first rotating member has a plurality of first holding portions formed at a predetermined distance along the outer peripheral surface of the first rotating member, the plurality of first holding portions each holding the base part in a state in which the support portion is located outside of the base part in a radial direction of the first arc, the first rotating member causing each of the plurality of support arms to rotate in the first circumferential direction by rotation, the second rotating member has a plurality of second holding portions formed in a groove shape at the predetermined distance on an outer peripheral surface of the second rotating member, the plurality of second holding portions each holding the base part in a state in which the support portion is located inside of the base part in the radial direction of the second arc, the second rotating member causing each of the plurality of support arms to rotate in the second circumferential direction by rotation, and the rotation mechanism causes the second rotating member to rotate in the second circumferential direction by a length of the predetermined distance when causing the first rotating member to rotate in the first circumferential direction by the length of the predetermined distance. Note that it is preferable that the second arc is formed in contact with the first arc.

According to the present invention, since the rotation mechanism causes the second rotating member to rotate in the second circumferential direction by the length of the predetermined distance when the rotation mechanism causes the first rotating member to rotate in the first circumferential direction by the length of the predetermined distance, the base part held by the first holding portion can be moved to be held by the second holding portion when the first holding portion and the second holding portion face each other.

In the present invention, the first holding portion holds the base part of each of the plurality of support arms in a state in which the support portion is located outside of the base part, and the second holding portion holds the base part of each of the plurality of support arms in a state in which the support portion is located inside of the base part. Accordingly, in the first rotating member comprising the first holding portions, when the base part of the support arm is moved by a predetermined length, a movement length of the support portion located outside of the base part is longer than the predetermined length. In contrast, in the second rotating member comprising the second holding portions, when the base part of the support arm is moved by the predetermined length, a movement length of the support portion located inside of the base part is shorter than the predetermined length. Therefore, when the plurality of support arms are moved from the first holding portion to the second guide portion, a distance between the support portions of the support arms adjacent to each other becomes narrower.

According to the present invention, since the support portion supports the leg of the object member, a distance between the legs of the object members adjacent to each other can also be made narrower by reducing the distance between the support portions of the support arms adjacent to each other. Thus, the plurality of object members guided in the second holding portions can be assembled in a smaller range as compared with a case where the plurality of object members are guided in the first holding portions.

It is preferable that a radius of curvature of the first rotating member is different from a radius of curvature of the second rotating member.

According to this configuration, a rotational angle of the rotating member having a larger radius of curvature of the first rotating member and the second rotating member is smaller than that of the rotating member having a smaller radius of curvature, the rotational angle being required when the first rotating member and the second rotating member rotate by the same length. Accordingly, the angle provided for the outer peripheral portion of the rotating member having a larger radius of curvature can be smaller than that of the rotating member having a smaller radius of curvature. Therefore, a demand that a space is secured around the rotating member having a smaller radius of curvature can be flexibly met.

It is preferable that the first holding portions are formed from grooves formed on the outer peripheral surface of the first rotating member.

According to this configuration, the base part can be securely held, and the looseness caused when the support arm is moved can be suppressed.

Furthermore, it is preferable that the second holding portion is formed from an arc-shaped groove, and the base part is formed from a roller to be fitted to the second holding portion.

According to this configuration, since the base part is a roller, the base part being a roller can rotate in the second holding portion even after the base part is held by the second holding portion, and an angle (orientation) of the support arm can be adjusted.

It is preferable that the rotation mechanism includes a first pulley that is provided at a rotation center of the first rotating member, a second pulley that is provided at a rotation center of the second rotating member, a rotatable drive pulley, a motor that rotates the drive pulley, and a belt that is wound around the first pulley, the second pulley, and the drive pulley so that the first pulley rotates in the first circumferential direction and the second pulley rotates in the second circumferential direction.

According to this configuration, with a simple configuration, the second rotating member can be rotated in the second circumferential direction by a length of a predetermined distance when the first rotation member is rotated in the first circumferential direction by the length of the predetermined distance. For example, when the radius of curvature of the first rotating member is the same as the radius of curvature of the second rotating member, the first pulley and the second pulley are formed to have the same diameter, and when the radius of curvature of the first rotating member is one third of the radius of curvature of the second rotating member, the first pulley is formed to have a diameter three times larger than the second pulley.

DETAILED DESCRIPTION OF THE PREFERRED EMBODIMENTS

Hereinafter, embodiments of the present invention will be described with reference to the drawings.

First, an example of a structure of a rotating electric machine will be described.

Figure 1:
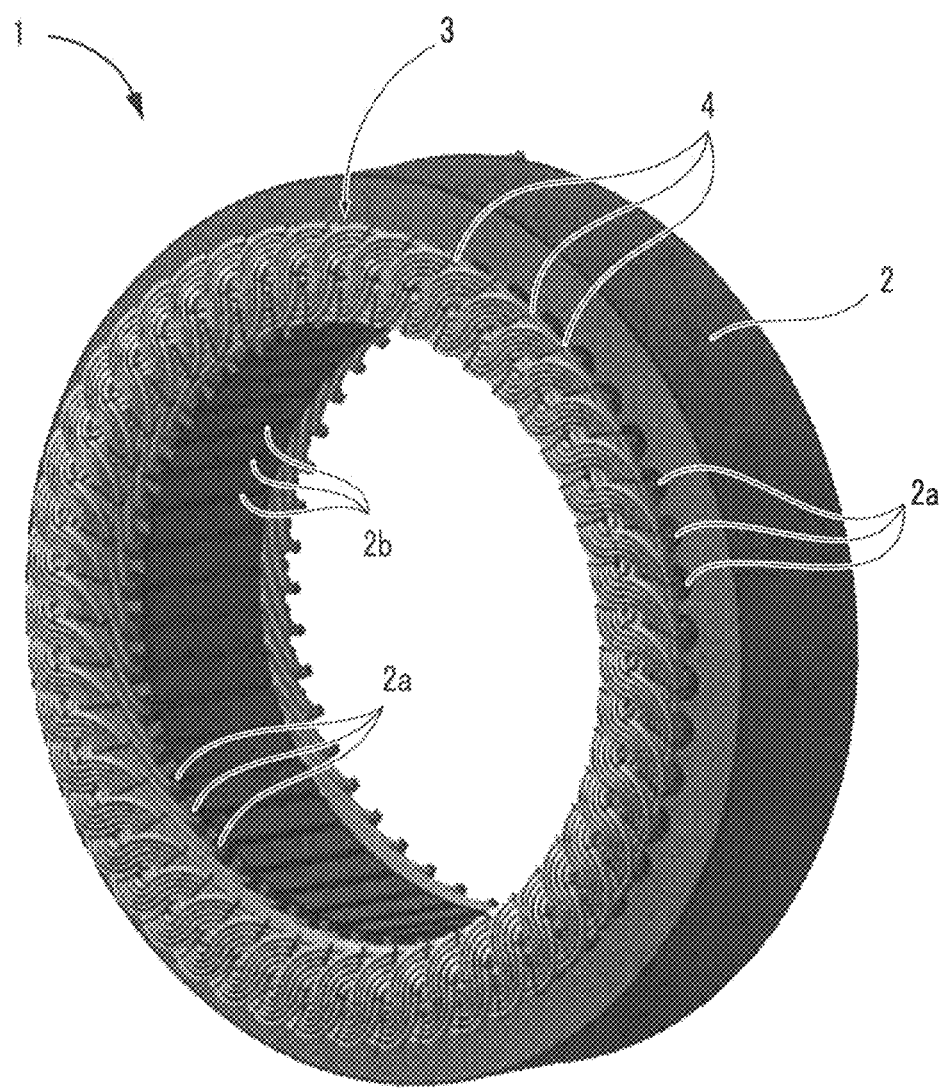
FIG. 1 is a perspective view illustrating a stator of a rotating electric machine into which coil segments assembled by an assembling device of the present invention are inserted.
Figure 2:
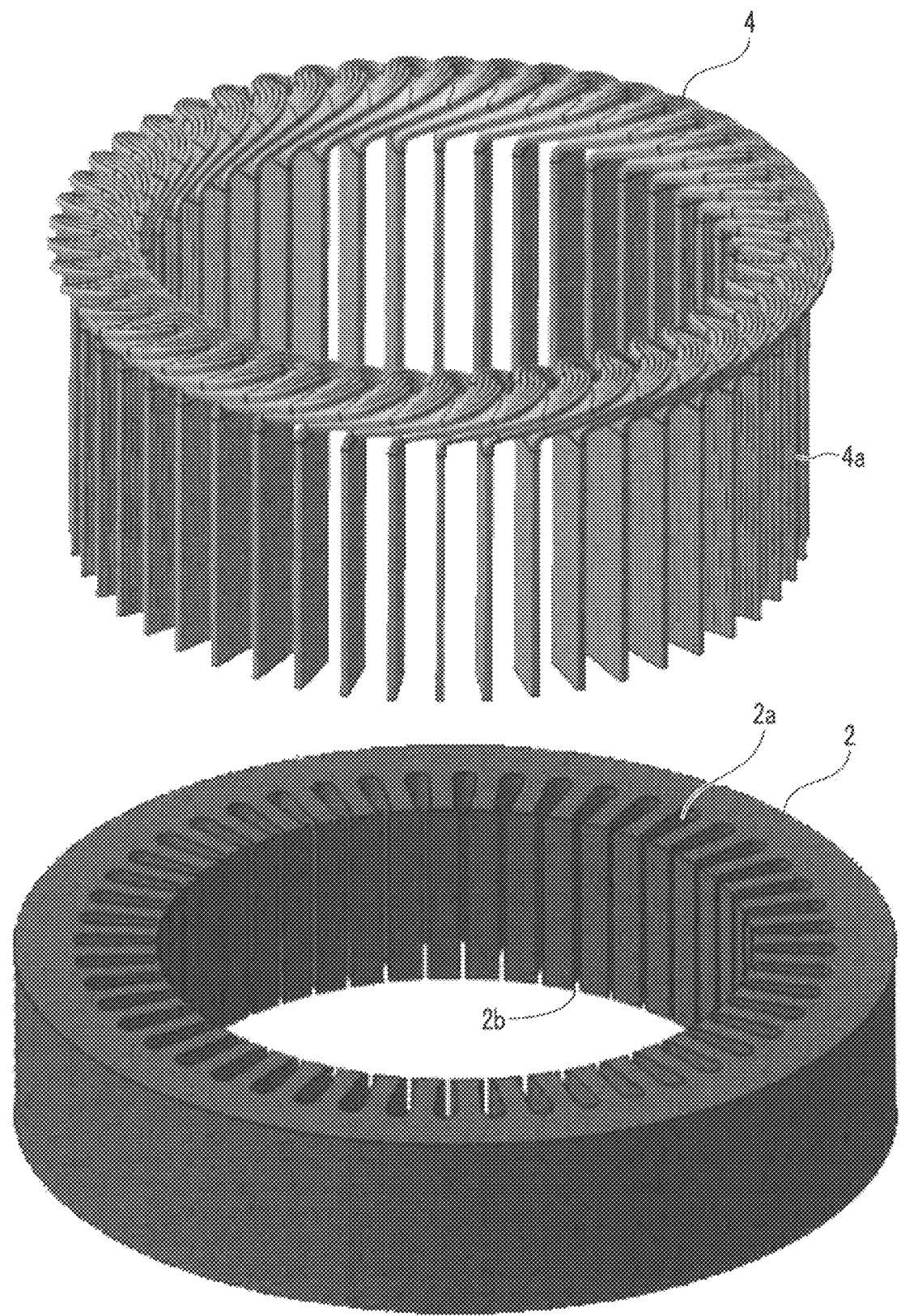
FIG. 2 is a perspective view illustrating a stator core and a coil segment.

As illustrated in FIG. 1 and FIG. 2, the rotating electric machine such as an electric motor or an electric generator includes a stator 1 formed in a cylindrical shape, and a rotor (not illustrated) rotatably disposed on the inner side of the stator 1.

The stator 1 includes a stator core 2 and a coil 3. The stator core 2 has a cylindrical shape, and has a plurality of slots 2a which penetrate in the direction of a rotation axis, the slots 2a being spaced apart in a circumferential direction. The slots 2a are formed such that the shapes of the cross sections thereof in the radial direction of the stator core 2 radially elongate from the center side of the stator core 2 in the radial direction, and are in communication with the inner peripheral surface of the stator core 2 through slits 2b formed in the stator core 2. Note that the slits 2b need not be provided.

Figure 3:
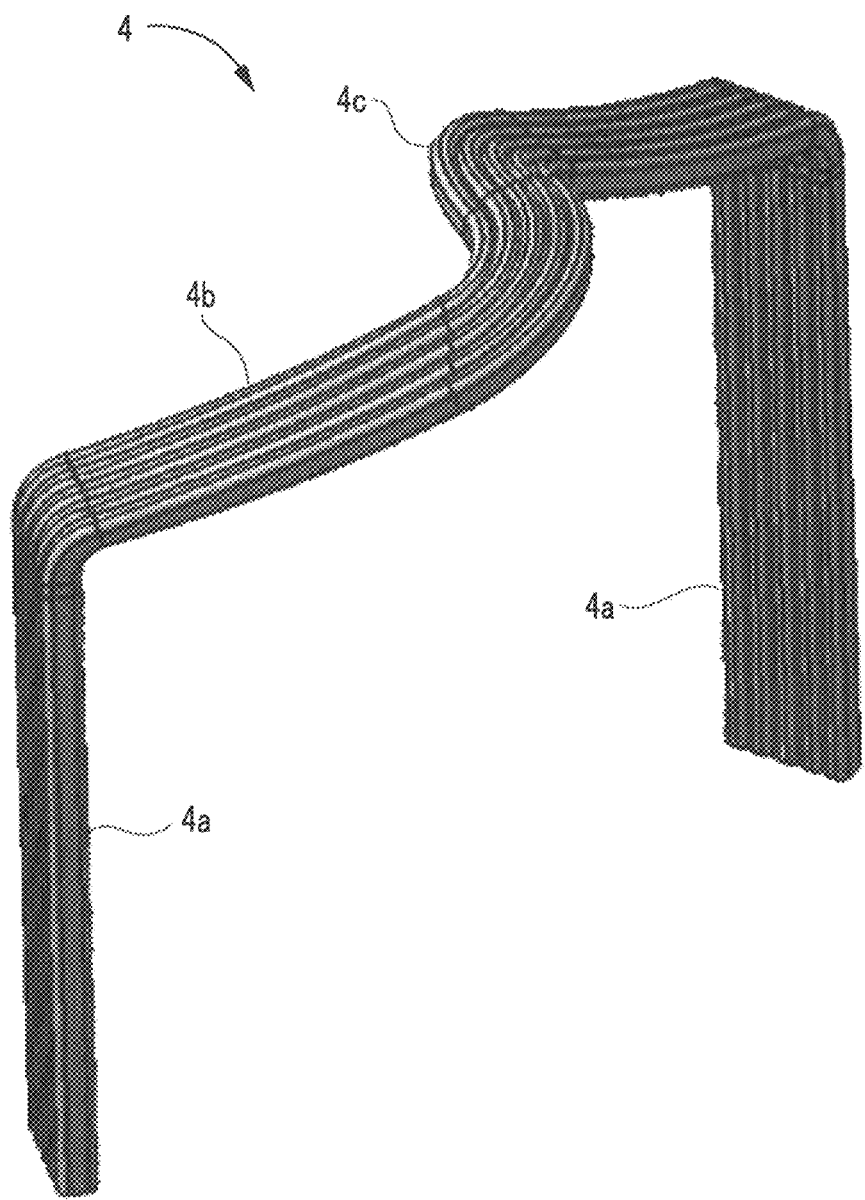
FIG. 3 is a perspective view illustrating the coil segment.

The coil 3 is formed by inserting coil segments 4, one of which is illustrated in FIG. 3, into the slots 2a from one side and by twisting and bending in the circumferential direction the projecting portions thereof that project from the other side of the slots 2a and then welding the projecting portions.

Each of the coil segments 4 is formed by bundling a plurality of (four in the present embodiment) conductors having rectangular cross sections (rectangular conducting wires) by arranging the conductors side by side such that wide surfaces thereof face each other and then forming the bundle into a U-shape. The coil segment 4 is made up of a pair of legs 4a, 4a and a head 4b (connecting portion) that connects one ends (the upper ends in the figure) of the two legs 4a, 4a.

Note that the coil segment 4 may be any bundle of a plurality of rectangular wires aligned in the width direction, for example, a plurality of rectangular wires bundled side by side such that the narrow surfaces thereof face each other.

At the center of the head 4b, an S-shaped portion 4c, which curves in an S-shape in the lengthwise direction of the rectangular wires, is formed. Furthermore, the head 4b slopes downward from the center thereof (the center of the S-shaped portion 4c) toward the two legs 4a, 4a. The leg 4a of the coil segment 4 is inserted into the corresponding slot 2a from one side thereof. The leg 4a of the coil segment 4 projects from the other side of the slot 2a.

Figure 4A:
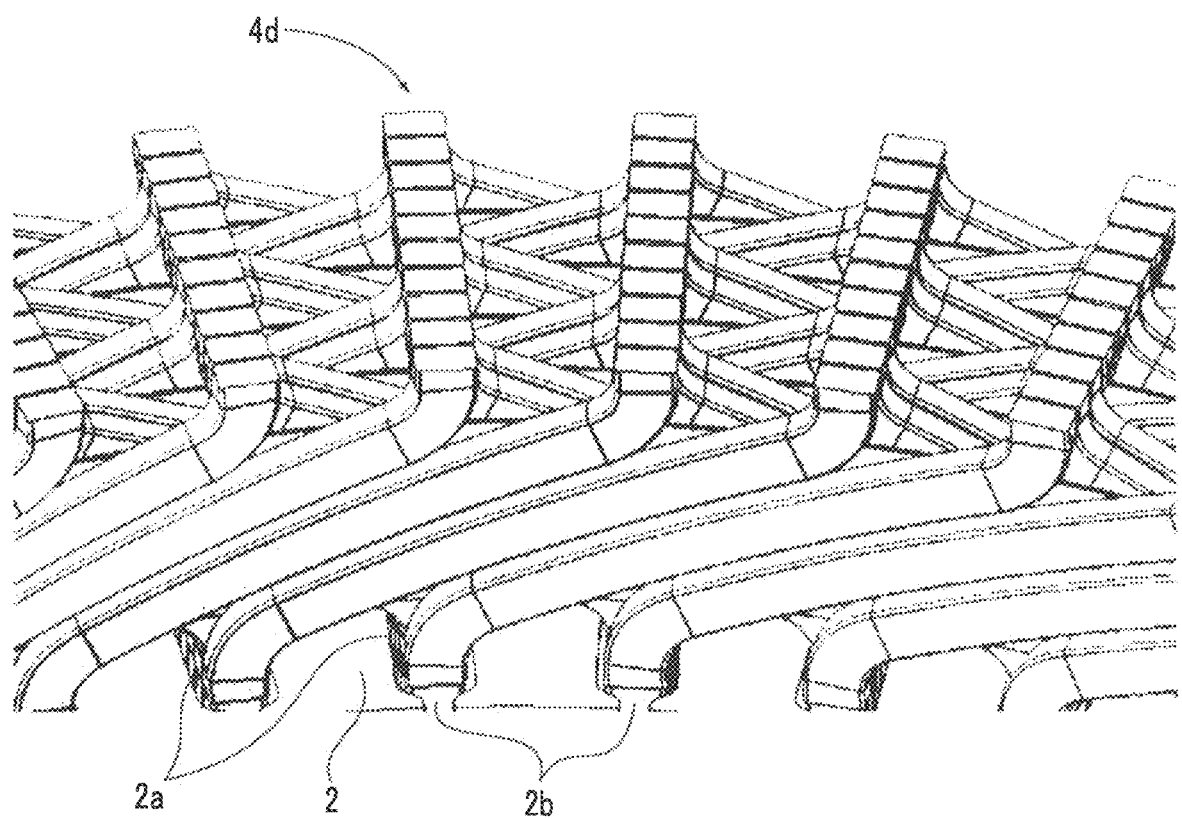
FIG. 4A is a perspective view illustrating a projecting portion of the coil segment.

A projecting portion 4d of the leg 4a, which projects from the other side of the slot 2a is bent in the circumferential direction of the stator core 2 by a bending device (not illustrated), as illustrated in FIG. 4A, and distal end portions 4e of matching projecting portions 4d are welded by a welding device (not illustrated). Thus, eight layers (eight pieces) of coil segments 4 are laminated in the radial direction to complete the stator 1. In this case, the layers are arranged in order, beginning with a first layer, a second layer, . . . , an eighth layer, from the radially inner side to the radially outer side.

Figure 4B:
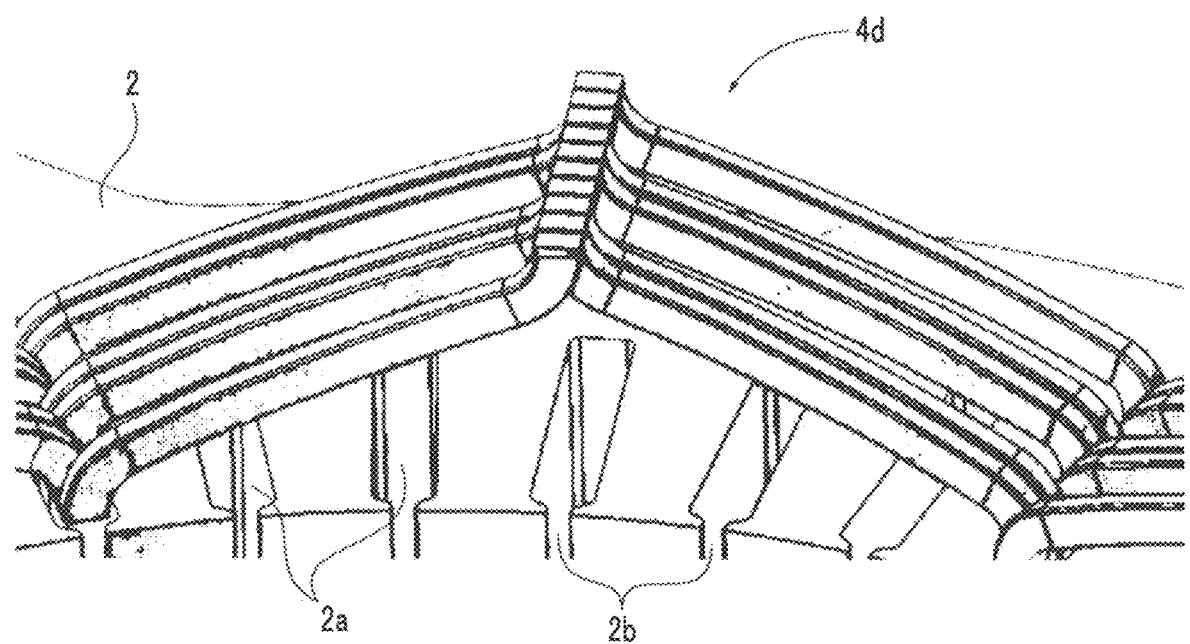
FIG. 4B is a perspective view illustrating a projecting portion of the coil segment.

Note that the coil 3 in the present embodiment is a three-phase coil consisting of a U-phase, a V-phase, and a W-phase. The legs 4a of the coil segments 4 inserted into each of the slots 2a are arranged in the order of the U-phase, the U-phase, the V-phase, the V-phase, the W-phase and the W-phase in the circumferential direction. FIG. 4B illustrates only the coil for one phase (e.g., the U-phase coil) of the three phases.

[Assembling Device]

Figure 5:
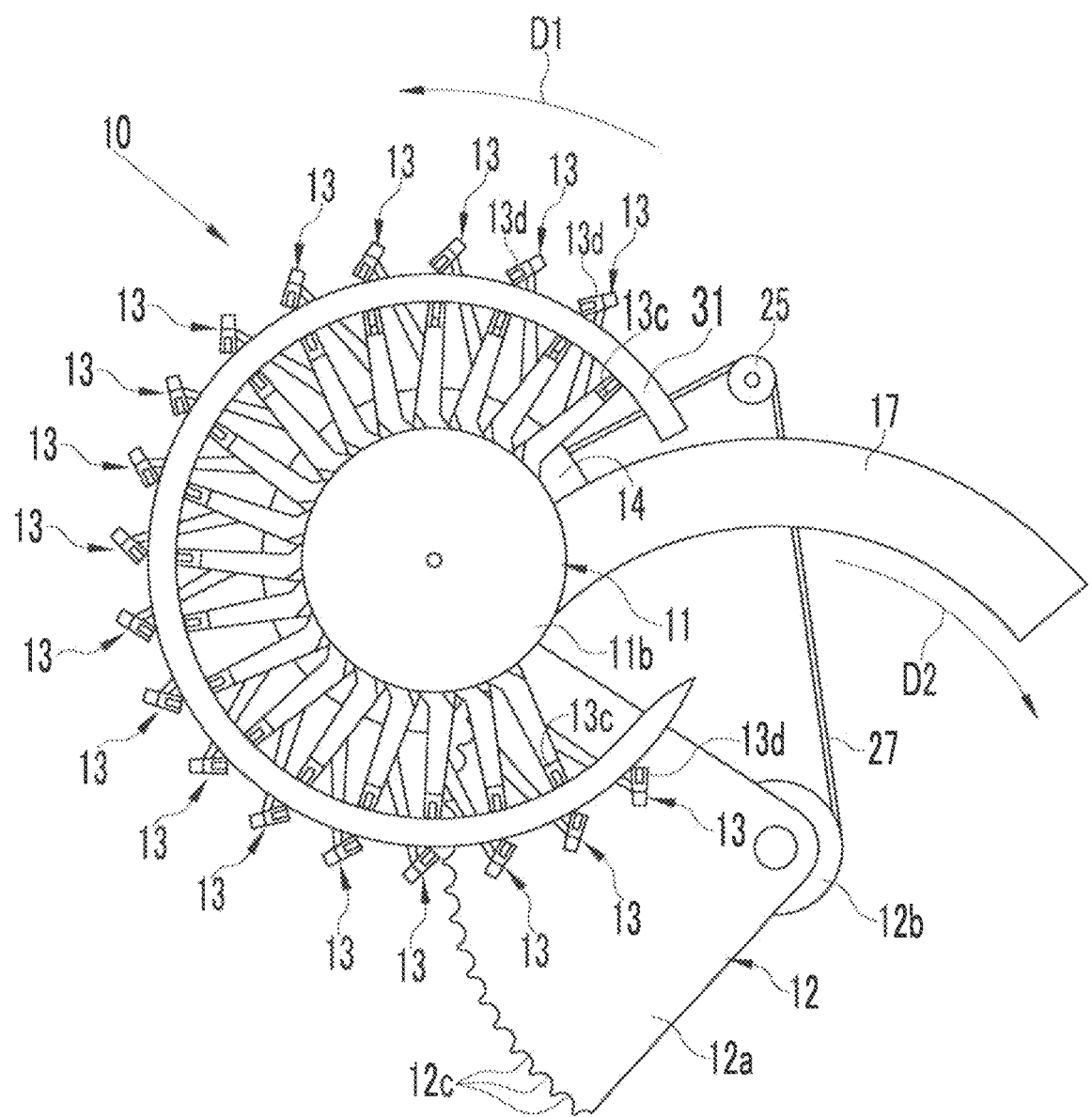
FIG. 5 is a top view illustrating an assembling device in a state in which support arms are inserted into a first holding portion.
Figure 6:
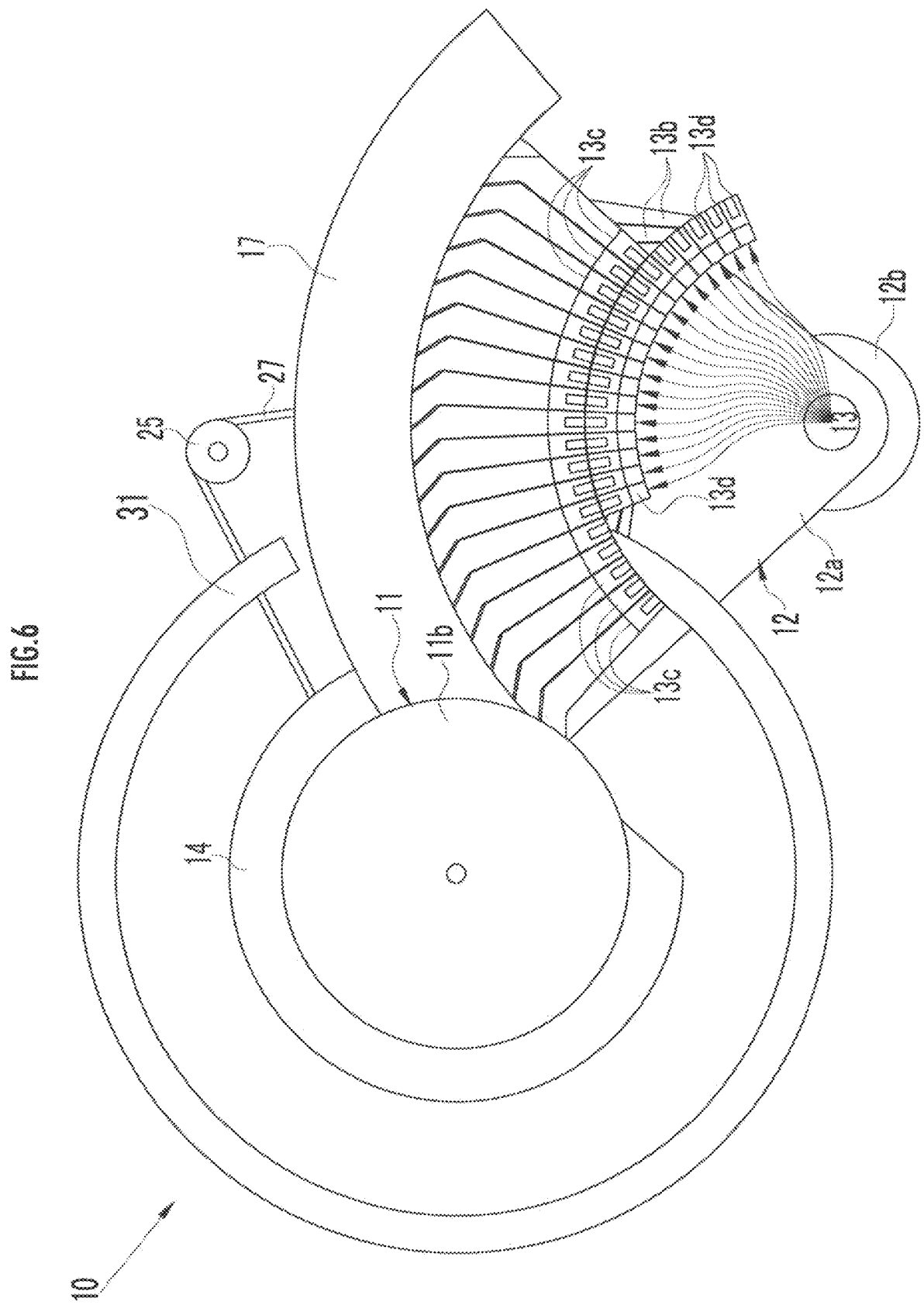
FIG. 6 is a top view illustrating the assembling device in a state in which the support arms are inserted by a second holding portion.

The following will describe an assembling device 10 for assembling the plurality (e.g., eighteen pieces) of coil segments 4 with reference to FIG. 5 and FIG. 6.

The assembling device 10 includes a first rotating portion 11 (a first rotating member) having a disk shape and being rotatable, a second rotating portion 12 (a second rotating member) having an arc-shaped outer peripheral portion, and eighteen support arms 13 that are rotated by the first rotating portion 11 and the second rotating portion 12. The first rotating portion 11 and the second rotating portion 12 are rotatably attached to a base (not illustrated). The eighteen support arms 13 support the coil segments 4, respectively. A radius of curvature of the first rotating portion 11 is different from a radius of curvature of the second rotating portion 12.

The first rotating portion 11 arranges the eighteen support arms 13 to form a fan-shape (see FIG. 5), and the second rotating portion 12 arranges to assemble the eighteen support arms (see FIG. 6).

In the present embodiment, the support arm 13 that is located closest to a counterclockwise direction D1 side in FIG. 5 of the eighteen support arms 13 is referred to as a first support arm 13, a support arm 13 that is linked to the first support arm 13 on a clockwise direction D2 side of the first support arm 13 is referred to as a second support arm 13, and the support arm 13 that is located closest to the clockwise direction D2 side in FIG. 5 is referred to as a eighteenth support arm 13.

Figure 7:
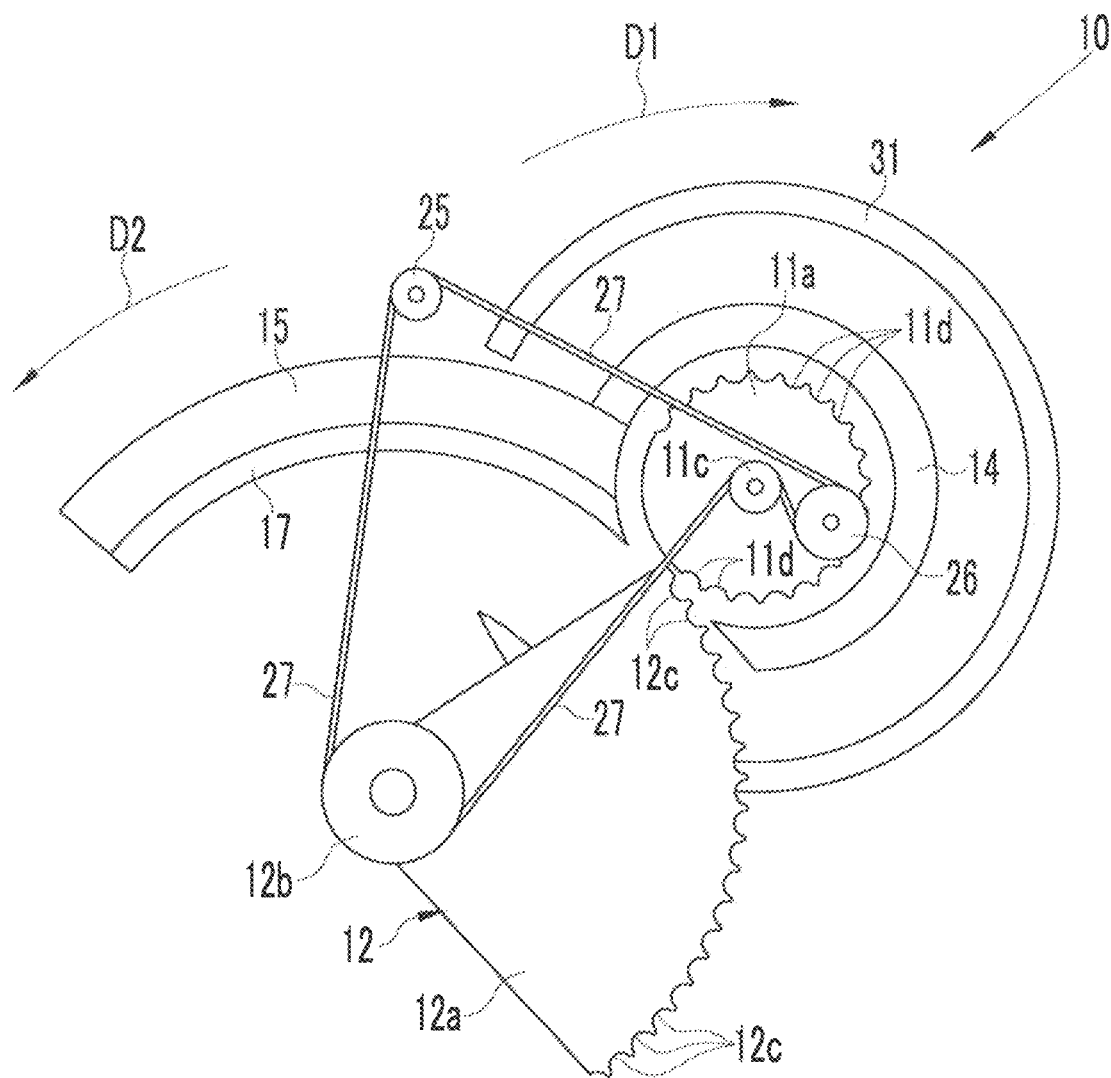
FIG. 7 is a bottom view illustrating the assembling device.

As illustrated in FIG. 7, the assembling device 10 includes a first guide plate 14, a second guide plate 15, a controller 16 (see FIG. 9), and a top cover 17 that covers the top of the second guide plate 15. The first guide plate 14 and the second guide plate 15 are attached to the base. The controller 16 includes, for example, a CPU, and centrally controls the assembling device 10. Note that the support arms 13 are not illustrated in FIG. 7.

The first rotating portion 11 includes a first rotating plate 11a, a first top plate 11b (see FIG. 5) that clamps the support arms 13 between itself and the first rotating plate 11a, and a first pulley 11c that is attached to a rotation center of a bottom surface of the first rotating plate 11a. The first top plate 11b is attached to the first rotating plate 11a. When the first top plate 11b is attached, the support arms are clamped between the first rotating plate 11a and the first top plate 11b. This enables looseness in the up-down direction of the support arms 13 to be suppressed.

Eighteen first holding portions 11d having a groove shape are formed with a predetermined pitch on an outer peripheral surface of the first rotating plate 11a so that base parts 21 of the support arms 13 are inserted in the first holding portions 11d, respectively, which will be described later in detail. The first guide plate 14 is formed in an arc shape outside of the first rotating plate 11a. The first guide plate 14 guides the base parts 21 which have been inserted in the first holding portions 11d so that the support arms 13 can rotate in the counterclockwise direction D1.

The second rotating portion 12 includes a second rotating plate 12a, and a second pulley 12b that is attached to a rotation center of a bottom surface of the second rotating plate 12a. The second pulley 12b is formed such that a winding diameter of a belt 27 on a groove portion of the second pulley 12b is (for example, three times) larger than the winding diameter of the belt 27 on a groove portion of the first pulley 11c, which will be described later in detail. Note that the diameter of the groove portion of the second pulley 12b may be the same as the diameter of the groove portion of the first pulley 11c. In this case, the first rotating plate 11a has the same diameter as the second rotating plate 12a.

Eighteen second holding portions 12c having a groove shape are formed with a predetermined pitch on an outer peripheral surface of the second rotating plate 12a so that the base parts 21 of the support arms 13 are inserted in the second holding portions 12c, respectively. The second guide plate 15 is formed in an arc shape outside of the second rotating plate 12a, and guides the base parts 21 which have been inserted in the second holding portions 12c so that the support arms 13 can rotate in the clockwise direction D2.

The assembling device 10 includes a drive pulley 25, a relay pulley 26, the belt 27, and a motor 29 (see FIG. 9) for rotating the drive pulley 25. The relay pulley 26 is rotatably attached to the base, and the motor 29 is attached to the base. The belt 27 is wound around the first pulley 11c, the second pulley 12b, the relay pulley 26, and the drive pulley 25. In the present embodiment, driving of the motor 29 is controlled by the controller 16.

In the present embodiment, when the motor 29 is driven to rotate the drive pulley 25, the second pulley 12b and the relay pulley 26 rotate in the same direction as the drive pulley 25, and the first pulley 11c rotates in the opposite direction to the drive pulley 25.

Figure 8:
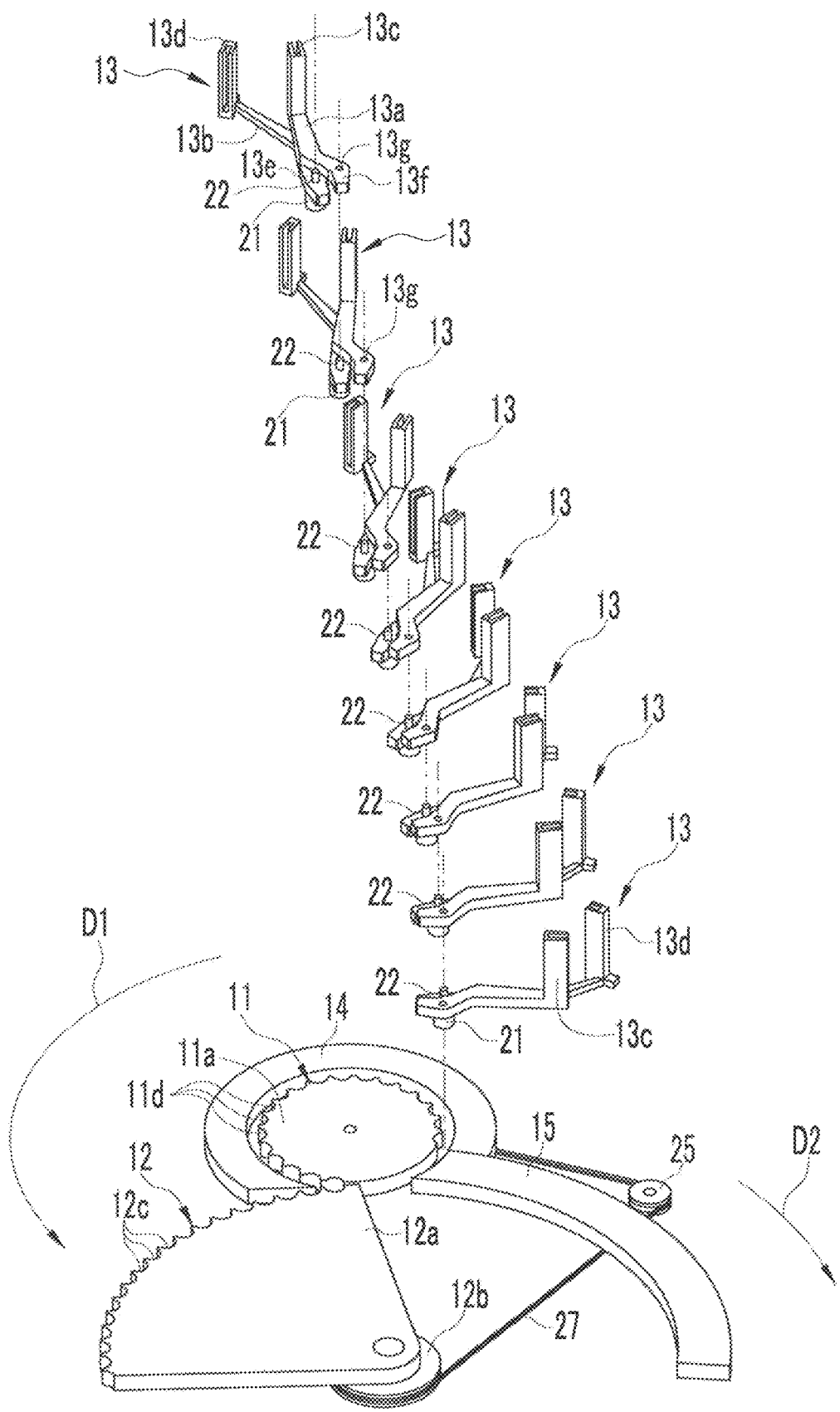
FIG. 8 is a perspective view illustrating a state in which the assembling device is disassembled.
Figure 9:
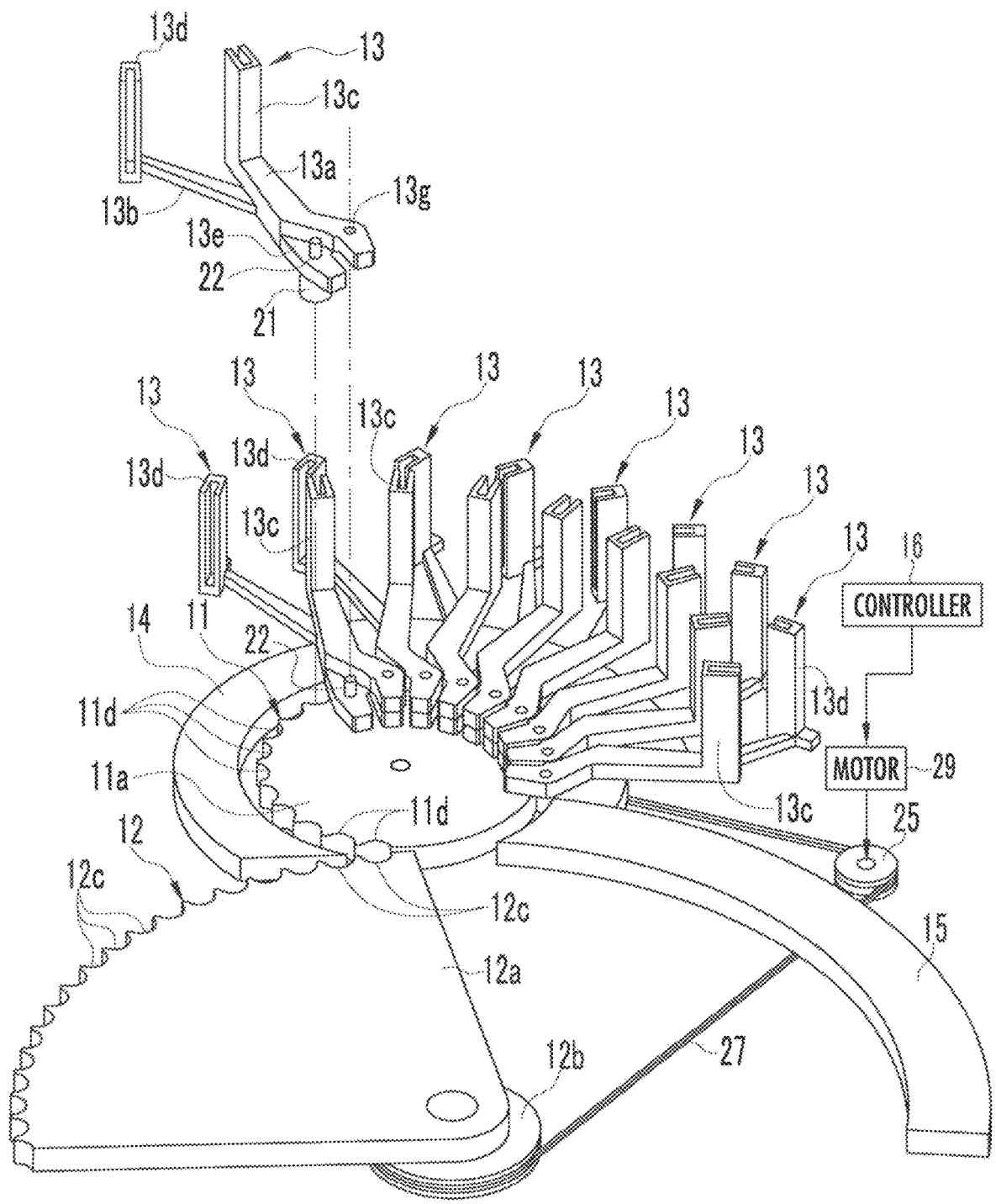
FIG. 9 is a perspective view illustrating a state in which the assembling device is disassembled.

As illustrated in FIG. 8 and FIG. 9, the support arm 13 includes a first arm portion 13a, and a second arm portion 13b which is connected to one end of the first arm portion 13a. The first arm portion 13a comprises a first holder 13c (a support portion) formed thereon, the first holder 13c having a recess formed for inserting one of the legs 4a of the coil segment 4.

The second arm portion 13b comprises a second holder 13d (a support portion) formed thereon, the second holder 13d having a recess formed for inserting the other leg 4a of the coil segment 4. Note that it is only required that at least one of the first holder 13c and the second holder 13d is formed.

The other end of the first arm portion 13a comprises a first plate portion 13e and a second plate portion 13f. The first plate portion 13e is formed below the second plate portion 13f, and the first plate portion 13e and the second plate portion 13f are formed in a stepped shape.

The base part 21 having, for example, a roller shape, is attached to the bottom surface of the first plate portion 13e so as to be rotatable in the counterclockwise direction D1 and the clockwise direction D2. A link shaft 22 is uprightly formed from the top surface of the first plate portion 13e so as to be coaxial with the base part 21.

The second plate portion 13f has a link hole 13g formed for inserting the link shaft 22 provided on the first plate portion 13e of the adjacent support arm 13. When the link shaft 22 is inserted into the link hole 13g of the adjacent support arm 13, the support arms 13 adjacent to each other are linked to move together. In the present embodiment, the support arms 13 adjacent to each other of the eighteen support arms 13 are linked to each other.

FIG. 9 illustrates that the eleventh to eighteenth support arms 13 are set in a state in which the support arms 13 adjacent to each other are linked to each other, and the tenth support arm 13 is to be set so as to be linked to the eleventh support arm 13.

Figure 10:
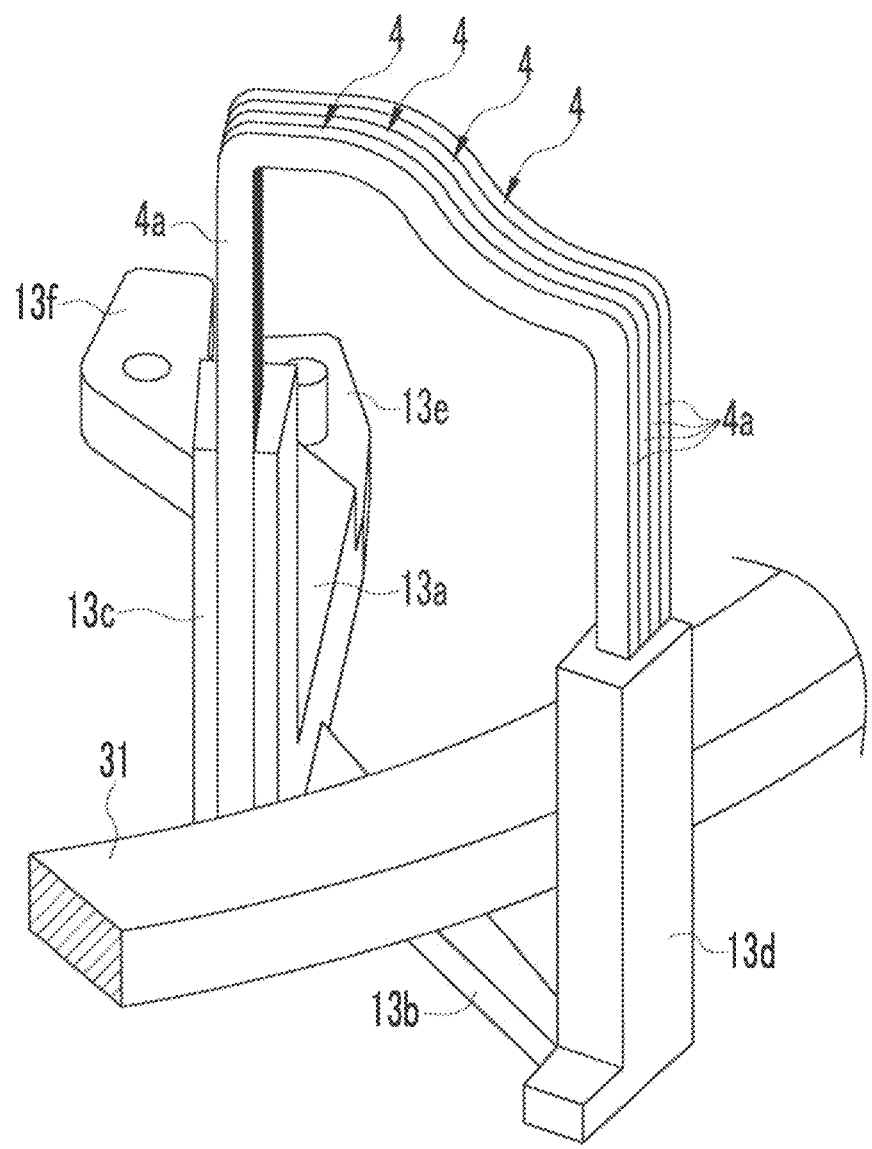
FIG. 10 is a perspective view illustrating the support arm, the coil segment, and an anti-extraction plate.

As illustrated in FIG. 10, the assembling device 10 comprises an anti-extraction plate 31 that prevents the leg 4a inserted into the first holder 13c and the leg 4a inserted into the second holder 13d from being extracted from the first holder 13c and the second holder 13d, respectively. The anti-extraction plate 31 is formed into an arc shape in such a manner to pass between the first holder 13c and the second holder 13d. Note that the anti-extraction plate 31 is not illustrated in FIG. 7 to FIG. 9.

Even when the legs 4a that have been inserted into the first holder 13c and the second holder 13d, respectively, are moved in the radial direction of the first rotating portion 11, the legs 4a are in contact with the anti-extraction plate 31. Thus, the legs 4a are prevented from being extracted from the first holder 13c and the second holder 13d. Note that the anti-extraction plate may not be provided.

Figure 11:
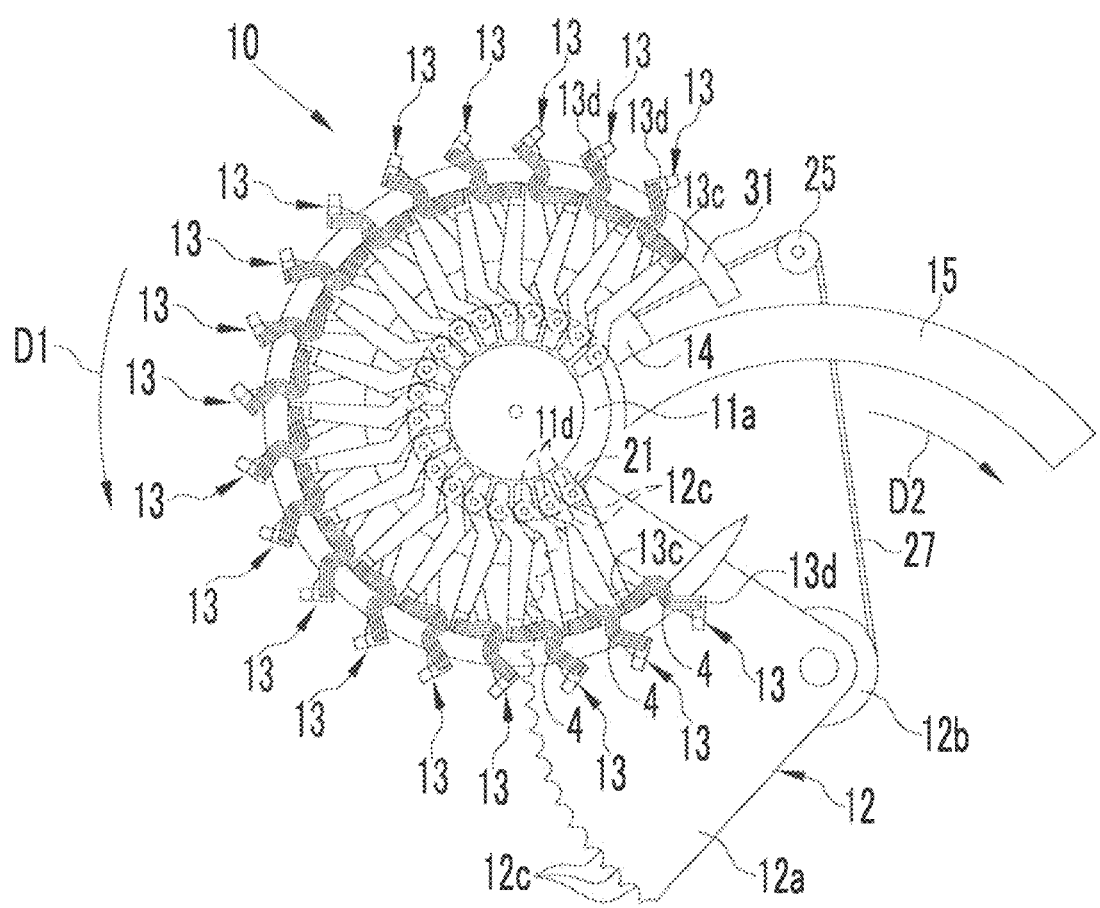
FIG. 11 is a top view illustrating the assembling device in a state in which a base part of a first support arm is held by a first holding portion of a first rotating plate.

In an initial state illustrated in FIG. 11, the first to eighteenth support arms 13 are positioned at the respective insertion positions where the coil segments 4 conveyed by a coil segment conveyer (not illustrated) are to be inserted into the first to eighteenth support arms 13. At this time, the base part 21 of the first support arm 13 is held only by the first holding portion 11d of the first rotating plate 11a (the second holding portion 12c of the second rotating plate 12a does not hold the base part 21 of the first support arm 13).

[Coil Segment Assembly]

When the plurality (eighteen pieces) of coil segments 4 are assembled at positions corresponding to the slots of the stator core 2, i.e. slots 2a, using the assembling device 10, firstly, the controller 16 sets the first to eighteenth support arms 13 so as to be positioned at the insertion positions as illustrated in FIG. 11. Note that the first top plate 11b and the top cover 17 are not illustrated in FIG. 11 to FIG. 14.

A coil segment conveyer conveys the coil segment 4, and the pair of legs 4a, 4a are inserted into the first holder 13c and the second holder 13d of the first support arm 13 (inserting control). The coil segment conveyer also performs the above-described inserting control on the second to eighteenth support arms 13.

Next, the controller 16 drives the motor 29 to rotate the drive pulley 25 in the clockwise direction D2. When the drive pulley 25 rotates in the clockwise direction D2, the first pulley 11c rotates in the counterclockwise direction D1, and the second pulley 12b rotates in the clockwise direction D2. Thus, the first rotating plate 11a to which the first pulley 11c is attached rotates in the counterclockwise direction D1, and the second rotating plate 12a to which the second pulley 12b is attached rotates in the clockwise direction D2.

Figure 12:
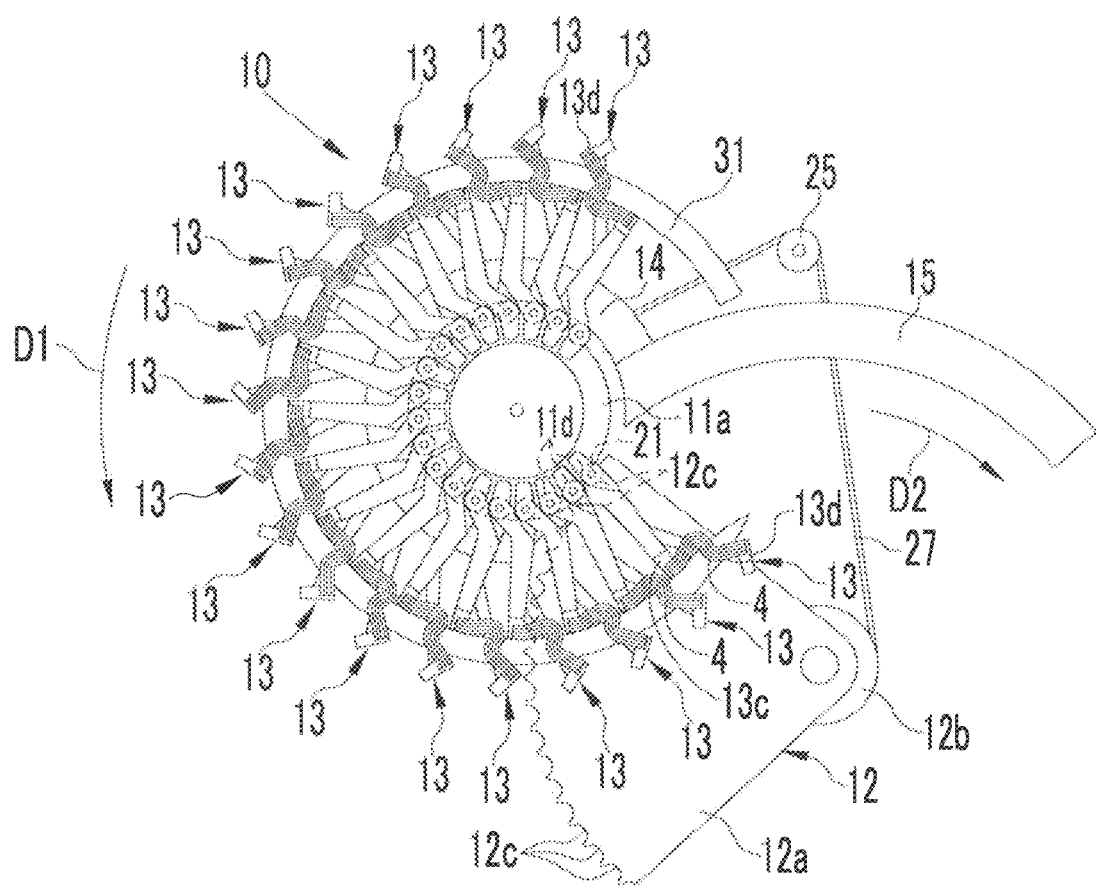
FIG. 12 is a top view illustrating the assembling device in a state in which the base part of the first support arm is held by the first holding portion of the first rotating plate and a second holding portion of a second rotating plate.

In the present embodiment, the second pulley 12b is formed such that a winding diameter of the belt 27 on the groove portion of the second pulley 12b is three times larger than the winding diameter of the belt 27 on the groove portion of the first pulley 11c. Thus, as illustrated in FIG. 12, when the first rotating plate 11a rotates by a predetermined angle (e.g., 15°) from the state illustrated in FIG. 11, the second rotating plate 12a rotates by 5° which is one third of the predetermined angle. A rotated arc length of the first holding portion 11d when the first rotating plate 11a rotates by 15° is the same as the rotated arc length of the second holding portion 12c when the second rotating plate 12a rotates by 5°.

In the state illustrated in FIG. 12, the base part 21 of the first support arm 13 is held by both of the first holding portion 11d of the first rotating plate 11a and the second holding portion 12c of the second rotating plate 12a.

Figure 13:
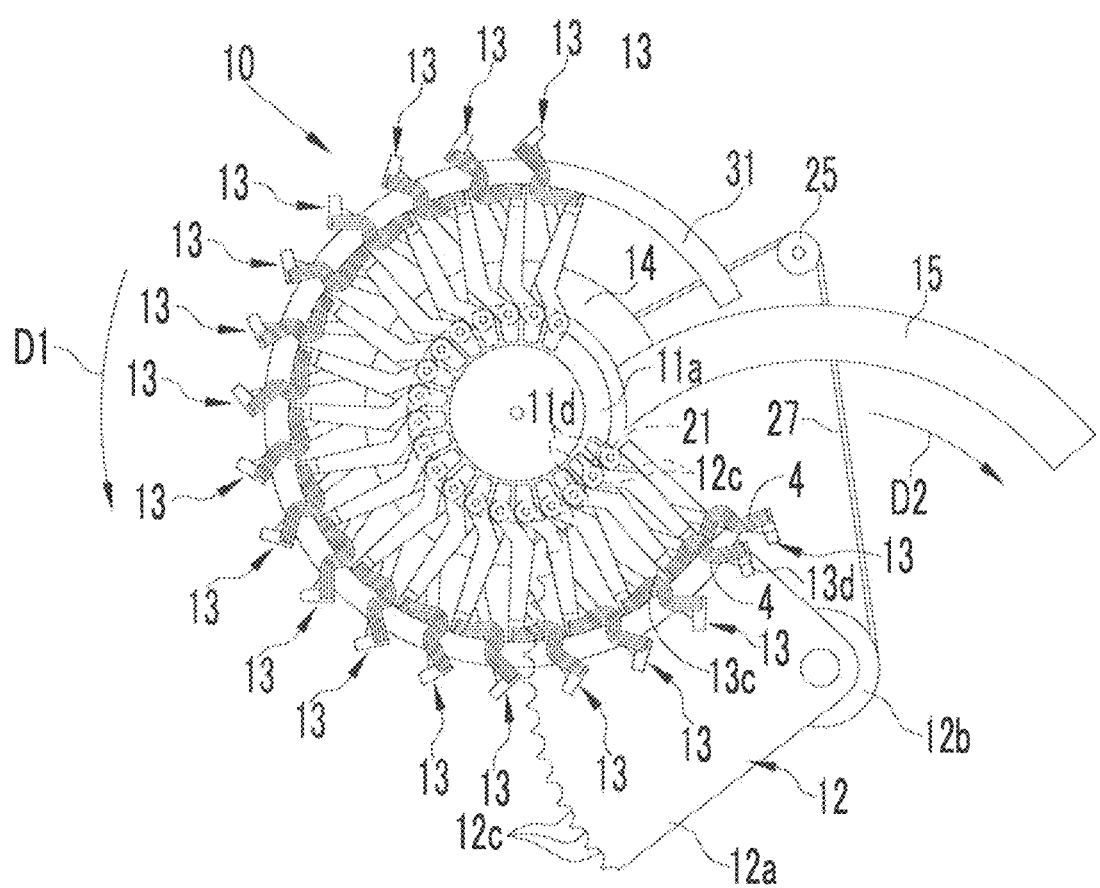
FIG. 13 is a top view illustrating the assembling device in a state in which the base part of the first support arm is held by the second holding portion of the second rotating plate.

When the first rotating plate 11a rotates by 15° and the second rotating plate 12a rotates by 5° from the state illustrated in FIG. 12, the base part 21 of the second support arm 13 is held by both of the first holding portion 11d of the first rotating plate 11a and the second holding portion 12c of the second rotating plate 12a and the base part 21 of the first support arm 13 is held only by the second holding portion 12c of the second rotating plate 12a (the first holding portion 11d of the first rotating plate 11a does not hold the base part 21 of the first support arm 13) as illustrated in FIG. 13.

Figure 14:
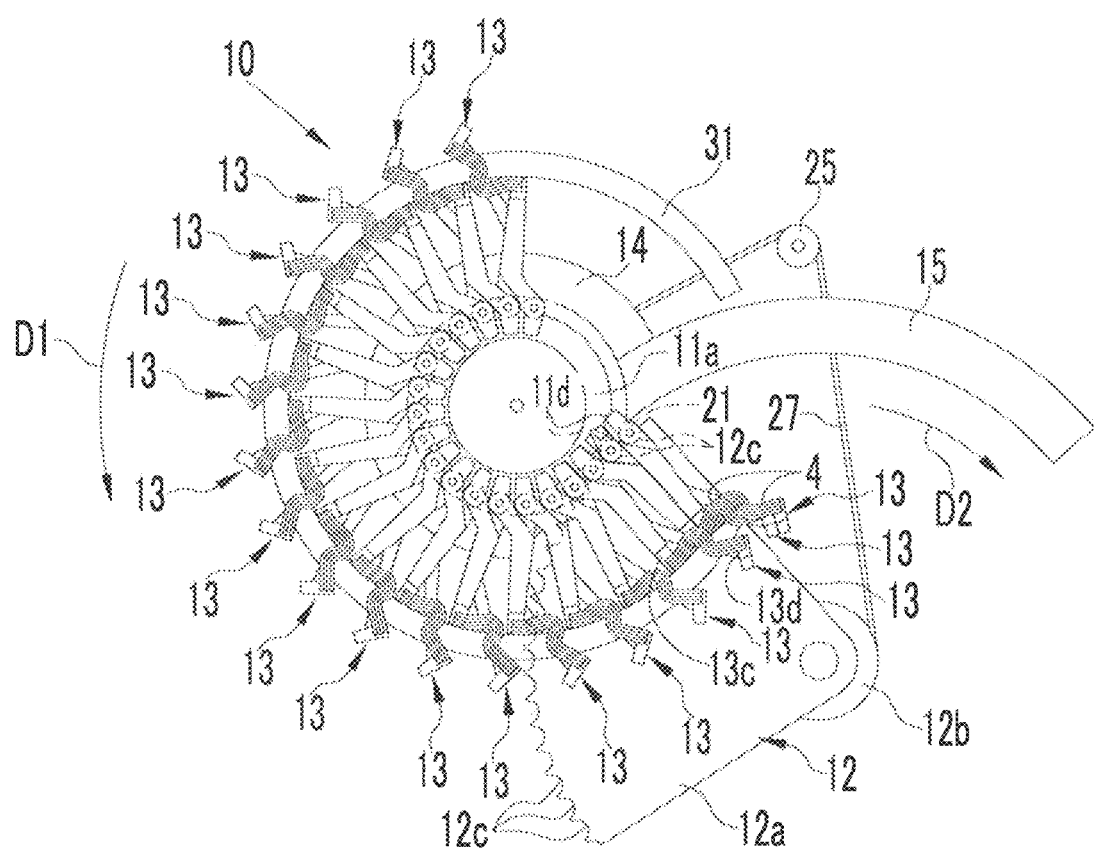
FIG. 14 is a top view illustrating the assembling device in a state in which the base part of the first support arm and the base part of a second support arm are held by the second holding portion of the second rotating plate.

When the first rotating plate 11a rotates by 15° and the second rotating plate 12a rotates by 5° from the state illustrated in FIG. 13, the base part 21 of the third support arm 13 is held by both of the first holding portion 11d of the first rotating plate 11a and the second holding portion 12c of the second rotating plate 12a and the base parts 21 of the first support arm 13 and the second support arm 13 are held only by the second holding portions 12c of the second rotating plate 12a as illustrated in FIG. 14.

In the states illustrated in FIG. 13 and FIG. 14, the first support arm 13 and the second support arm 13 rotate in the clockwise direction D2 in a state in which the base parts 21 are held only by the second holding portions 12c of the second rotating plate 12a.

In the states illustrated in FIG. 13 and FIG. 14, the first holder 13c and the second holder 13d are positioned inside the base part 21 in the radial direction of the second rotating plate 12a. Accordingly, when the first support arm 13 and the second support arm 13 rotate in the clockwise direction D2, the first holder 13c and the second holder 13d of the first support arm 13 approach the first holder 13c and the second holder 13d of the second support arm 13.

In the state illustrated in FIG. 14, the head 4b of the coil segment 4 supported by the first support arm 13 overlaps with the head 4b of the coil segment 4 supported by the second support arm 13.

Figure 15:
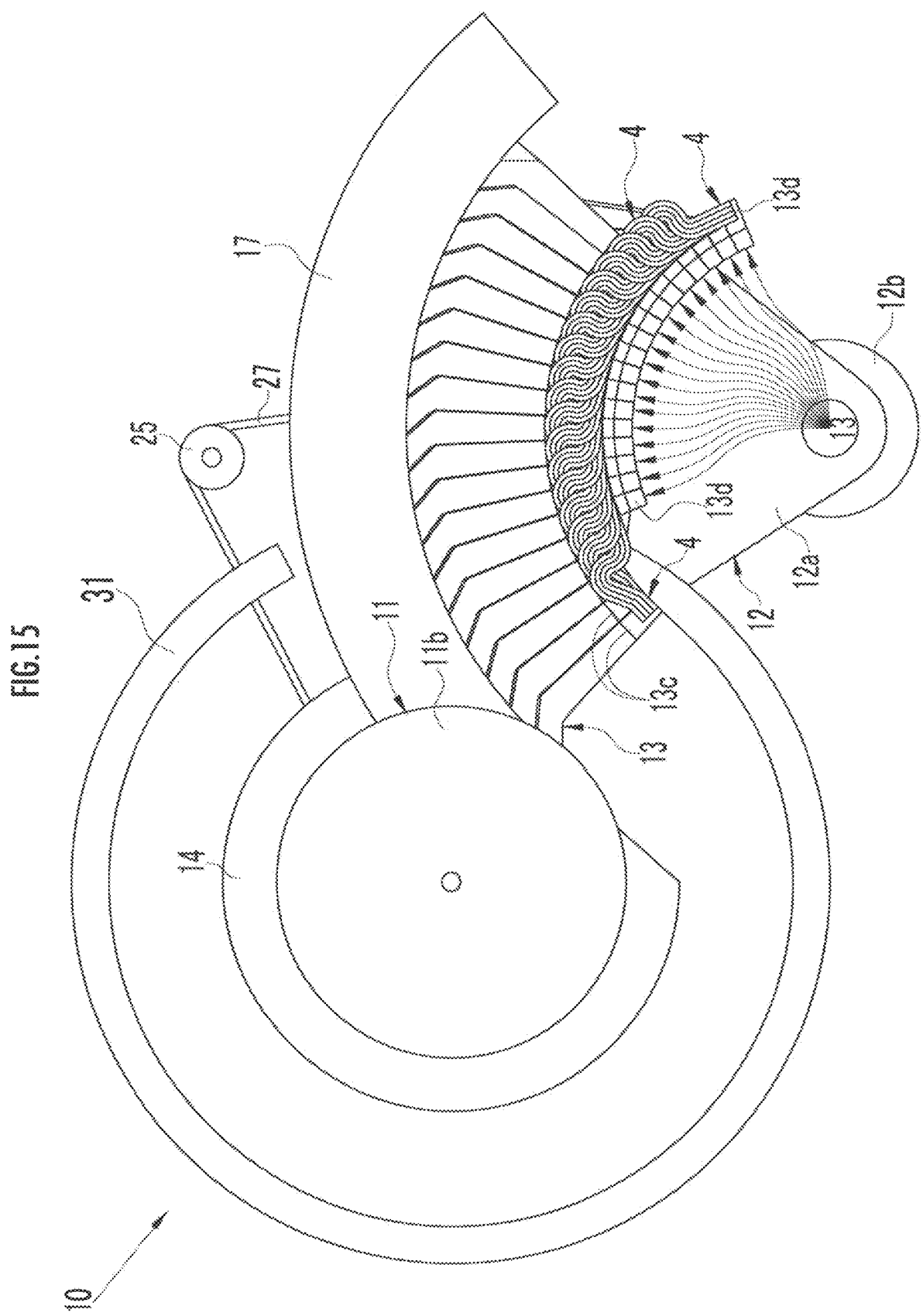
FIG. 15 is a top view illustrating the assembling device in a state in which the coil segments are assembled.

The controller 16 drives the motor 29 so that, for example, the first rotating plate 11a rotates by 270° and the second rotating plate 12a rotates by 90° from the state illustrated in FIG. 12. Thus, all of the base parts 21 of the first to eighteenth support arms 13 are held by the second holding portions 12c of the second rotating plate 12a. From this state, the controller 16 further drives the motor 29 so that, for example, the first rotating plate 11a rotates by 30° and the second rotating plate 12a rotates by 10°. Thus, as illustrated in FIG. 15, the coil segments 4 supported by the respective first to eighteenth support arms 13 are assembled so as to overlap with one another.

A coil segment assembly device (not illustrated) holds and conveys the eighteen coil segments 4 that are assembled so as to overlap with one another, and inserts the legs 4a into the slots 2a of the stator core 2.

The eighteen coil segments 4 assembled by the assembling device 10 are positioned at positions corresponding to the respective slots 2a. Therefore, the eighteen coil segments 4 can be securely inserted into the slots 2a.

In the present embodiment, the second pulley 12b is formed such that the winding diameter of the belt 27 on the groove portion of the second pulley 12b is three times larger than the winding diameter of the belt 27 on the groove portion of the first pulley 11c, and therefore the rotational angle of the second rotating plate 12a is one third of the rotational angle of the first rotating plate 11a. Accordingly, the orientation angle of the second rotating plate 12a can be smaller than the orientation angle of the first rotating plate 11a, thereby flexibly meeting a demand that a space is secured around the first rotating plate 11a, etc.

The winding diameter of the belt 27 on the groove portion of the second pulley 12b may be smaller than the winding diameter of the belt 27 on the groove portion of the first pulley 11c. In this case, the rotational angle of the first rotating plate 11a is smaller than the rotational angle of the second rotating plate 12a. Accordingly, the orientation angle of the first rotating plate 11a can be smaller than the orientation angle of the second rotating plate 12a, thereby flexibly meeting a demand that a space is secured around the second rotating plate 12a, etc.

Note that in the above-described embodiment, the first holding portions 11d are formed on the outer peripheral surface of the first rotating plate 11a, but the first holding portions 11d may not be provided. In this case, for example, the base parts 21 of the first to eighteenth support arms 13 are held on the outer peripheral surface of the first rotating plate 11a so as to rotate together with the first rotating plate 11a when the first rotating portion 11 rotates in the counterclockwise direction D1, and a pressing member for pressing the base part 21 of the eighteenth support arm 13 to rotate in the counterclockwise direction D1 is provided. Thus, the first to eighteenth support arms 13 can be rotated in the counterclockwise direction D1 in response to rotation of the first rotating portion 11 in the counterclockwise direction D1.

In the above-described embodiment, the base parts 21 of the support arms 13 are held by the second holding portions 12c formed in the second rotating plate 12a, but the second rotating plate 12a may have projection portions formed thereon and the support arms 13 each may have a hole or a groove so that the projecting portions of the second rotating plate 12a hold the holes or the grooves of the support arms 13.

In the above-described embodiment, the support arms 13 adjacent to each other are linked to each other, but they may not be linked to each other.

In the above-described embodiment, the first rotating portion 11 and the second rotating portion 12 are rotated in the opposite direction to each other by a rotation mechanism comprising the first pulley 11c, the second pulley 12b, the drive pulley 25, the relay pulley 26, the belt 27, and the motor 29, but a rotation mechanism may be provided in which a gear is provided to each of the first rotating portion 11 and the second rotating portion 12, these gears are engaged with each other, and one of the gears is rotated by the motor so that the first rotating portion 11 and the second rotating portion 12 are rotated in the opposite direction to each other.

The belt 27 may be a belt having both surfaces on which gear tooth forms are formed, and gear teeth for engaging with gear teeth of the belt may be formed on the outer peripheral surface of each axis of the first pulley 11c, the second pulley 12b, the drive pulley 25, and the relay pulley 26.

In the above-described embodiment, the present invention is implemented with an assembling device for assembling the U-shaped coil segments 4 while overlapping with one another, but the present invention can be implemented on any assembling device for assembling object members having two legs and a connecting portion connecting the two legs. For example, the present invention may be implemented on an assembling device for assembling object members having an H-shape or a V-shape.

What is claimed is:

1. An assembling device for assembling a plurality of object members, the object members each including two legs and a connecting portion connecting the two legs, the assembling device comprising:
  a plurality of support arms, the support arms each including a support portion for supporting a leg of the object member and a base part spaced apart from the support portion;
  a first rotating member that has an outer peripheral portion formed in a first arc, the first rotating member being arranged to be rotatable in a first circumferential direction around a center of curvature of the first arc;
  a second rotating member that has an outer peripheral portion adjacent to the first arc, the outer peripheral portion being formed in a second arc shape having a center of curvature that is located on an opposite side of the outer peripheral portion of the first rotating member from a center of curvature of the first arc, the second rotating member being arranged to be rotatable in a second circumferential direction opposite to the first circumferential direction around the center of curvature of the second arc; and
  a rotation mechanism that causes the first rotating member to rotate in the first circumferential direction, and causes the second rotating member to rotate in the second circumferential direction,
  wherein the first rotating member has a plurality of first holding portions formed at a predetermined distance along the outer peripheral surface of the first rotating member, the plurality of first holding portions each holding the base part in a state in which the support portion is located outside of the base part in a radial direction of the first arc, the first rotating member causing each of the plurality of support arms to rotate in the first circumferential direction by rotation,
  the second rotating member has a plurality of second holding portions formed in a groove shape at the predetermined distance on an outer peripheral surface of the second rotating member, the plurality of second holding portions each holding the base part in a state in which the support portion is located inside of the base part in the radial direction of the second arc, the second rotating member causing each of the plurality of support arms to rotate in the second circumferential direction by rotation, and
  the rotation mechanism causes the second rotating member to rotate in the second circumferential direction by a length of the predetermined distance when causing the first rotating member to rotate in the first circumferential direction by the length of the predetermined distance.

2. The assembling device according to claim 1, wherein a radius of curvature of the first rotating member is different from a radius of curvature of the second rotating member.

3. The assembling device according to claim 1, wherein the first holding portions are formed from grooves formed on the outer peripheral surface of the first rotating member.

4. The assembling device according to claim 1, wherein the second holding portion is formed from an arc-shaped groove, and the base part is formed from a roller to be fitted to the second holding portion.

5. The assembling device according to claim 1, wherein the rotation mechanism comprises:

a first pulley that is provided at a rotation center of the first rotating member, a second pulley that is provided at a rotation center of the second rotating member;

a rotatable drive pulley;

a motor that rotates the drive pulley; and a belt that is wound around the first pulley, the second pulley, and the drive pulley so that the first pulley rotates in the first circumferential direction and the second pulley rotates in the second circumferential direction.

* * * * *